(12) United States Patent
Moon et al.

(10) Patent No.: US 11,416,268 B2
(45) Date of Patent: *Aug. 16, 2022

(54) AGGREGATE FEATURES FOR MACHINE LEARNING

(71) Applicant: Twitter, Inc., San Francisco, CA (US)

(72) Inventors: Sean Moon, Brooklyn, NY (US); Arvind Thiagarajan, Northampton, MA (US); Mike Jahr, San Francisco, CA (US); Milind Ganjoo, San Francisco, CA (US); Parag Agrawal, Palo Alto, CA (US)

(73) Assignee: Twitter, Inc., San Francisco, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/929,375

(22) Filed: Apr. 29, 2020

(65) Prior Publication Data
US 2020/0257543 A1   Aug. 13, 2020

Related U.S. Application Data

(63) Continuation of application No. 15/675,671, filed on Aug. 11, 2017, now Pat. No. 10,649,794.
(Continued)

(51) Int. Cl.
*G06F 16/00*  (2019.01)
*G06F 9/445*  (2018.01)
(Continued)

(52) U.S. Cl.
CPC ...... *G06F 9/44589* (2013.01); *G06F 9/44552* (2013.01); *G06F 16/90324* (2019.01);
(Continued)

(58) Field of Classification Search
CPC ............. G06F 21/552; G06F 16/90335; G06F 16/90324
See application file for complete search history.

(56) References Cited

U.S. PATENT DOCUMENTS 9,037,483 B1 * 5/2015 Curcio ............... G06Q 30/0246
705/14.46
2005/0125280 A1 * 6/2005 Carr ................... G06Q 30/0631
705/26.7
(Continued)

OTHER PUBLICATIONS

Office Action for European Patent Application No. 17755014.2 dated Jan. 30, 2020, 9 pages.
(Continued)

*Primary Examiner* — Khanh B Pham
(74) *Attorney, Agent, or Firm* — Brake Hughes Bellermann LLP

(57) ABSTRACT

An example system includes a memory store of aggregate definitions. Each aggregate definition specifies a key value, an output store, a feature, a half-life value, and an aggregate operation metric to apply to a cross of the feature and the half-life value to generate aggregate metrics. The system also includes an aggregation engine that generates aggregate feature records from the input source based on the aggregate definitions and stores the aggregate feature records in the output store. An aggregate feature record includes an aggregate of the metric for the feature decayed over time using the half-life. The system also includes a query service that identifies, using the aggregate definitions, responsive aggregate feature records that satisfy parameters of a received request, applies the half-life to the responsive feature records, and provides the responsive feature records to a requester, the requester using the responsive feature records as input for a neural network.

20 Claims, 6 Drawing Sheets

Related U.S. Application Data

(60) Provisional application No. 62/373,946, filed on Aug. 11, 2016.

(51) Int. Cl.
| | | |
|---|---|---|
| *G06F 16/903* | (2019.01) | |
| *H04L 9/40* | (2022.01) | |
| *G06F 21/55* | (2013.01) | |
| *G06F 16/9032* | (2019.01) | |
| *G06N 20/00* | (2019.01) | |
| *G06N 3/04* | (2006.01) | |
| *G06N 3/08* | (2006.01) | |
| *G06Q 50/00* | (2012.01) | |

(52) U.S. Cl.
CPC ...... *G06F 16/90335* (2019.01); *G06F 21/552* (2013.01); *G06N 3/04* (2013.01); *G06N 3/08* (2013.01); *G06N 20/00* (2019.01); *H04L 63/1433* (2013.01); *G06Q 50/01* (2013.01)

(56) References Cited

U.S. PATENT DOCUMENTS

| | | |
|---|---|---|
| 2005/0125401 A1 | 6/2005 | Carr et al. |
| 2009/0240680 A1 | 9/2009 | Tankovich et al. |
| 2010/0179855 A1 | 7/2010 | Chen et al. |
| 2012/0078975 A1 | 3/2012 | Chen et al. |
| 2013/0304818 A1 | 11/2013 | Brumleve et al. |
| 2014/0052732 A1 | 2/2014 | Softky |
| 2015/0178265 A1 | 6/2015 | Anderson et al. |
| 2015/0195145 A1 | 7/2015 | Di Pietro et al. |
| 2016/0321261 A1 | 11/2016 | Spasojevic et al. |
| 2016/0371297 A1* | 12/2016 | Okun ............... G06F 16/168 |

OTHER PUBLICATIONS

International Search Report and Written Opinion for International Application No. PCT/US2017/046641, dated Oct. 2, 2017, 12 pages.

Summons to Attend Oral Proceedings for European Application No. 17755014.2, dated Jun. 18, 2021, 8 pages.

\* cited by examiner

200

```
Aggregate (
205 ──── aggregatePrefix = <prefix_string>,
210 ──── inputSource = (<path and name of input data records>),
215 ──── preTransformOp = (<Location of input transformation routine>),
220 ──── key = Set ( <one or more features> ),
225 ──── features = Set( <one or more binary or sparse features> ),
230 ──── labels = Set( <one or more binary features> ),
235 ──── halfLives = Set ( <one or more periods> ),
240 ──── operators = Set (<one or more aggregate operators> ),
245 ──── outputStore = <outputDestName> (
    250 ──── batchesToKeep = <number>
        )
    )
```

FIG. 2

AGGREGATE FEATURES FOR MACHINE LEARNING

RELATED APPLICATIONS

This application is a continuation of, and claims priority to, U.S. application Ser. No. 15/675,671, filed on Aug. 11, 2017, which is a Non-Provisional of, and claims priority to, U.S. Provisional Application No. 62/373,946, filed on Aug. 11, 2016, titled "Data Science and Machine Learning at Scale", the disclosures of which are incorporated herein by reference.

BACKGROUND

Machine learning is the field of study where a computer or computers learn to perform classes of tasks using the feedback generated from the experience or data that the machine learning process acquires during computer performance of those tasks. Typically, machine learning includes provide example inputs for training a machine learned model and, once the model has been trained, it can be used in an inference mode to perform the task on a new, previously unseen, input. The example inputs for training an inference are typically referred to as features. Predictions and classifications made by machine learning models are highly dependent on the features of the input provided. Historical data can be valuable for some such processes, but expensive to store and historical metrics (e.g., counts, averages, ratios, etc.) may require large amounts of processing cycles to calculate.

SUMMARY

Implementations provide a flexible infrastructure for defining, calculating, and using historical data to generate input features for a machine learned model. The features generated by the historical data can be used to improve the predictions of the model for particular data items (e.g., for personalized recommendations). Aggregate features are data records that store a value for an aggregate function (count, average, etc.) of a feature over some window of time. These values may be referred to herein as metrics or aggregate metrics. The infrastructure includes an aggregate definition schema and a common output data record format that enables new aggregates (groupings) and new metrics for the aggregates to be added on-the-fly. The aggregate feature records can be indexed by one or more fields. The schema enables a user to define what fields to index, what fields to perform the aggregate operations on, and how long of a half-life to apply to the decay. The schema can operate on any input records. The schema can be used by offline/batch processes, as well as online/real-time processes. Thus, implementations can capture signals that are important for a short time frame. Such aggregates can be used to provide more relevant content for a particular user with low latency, e.g., to find real-time information and to provide query suggestions (e.g., type-ahead, spelling, related searches) that are also fresh and real-time.

In one aspect, a system includes at least one processor and memory storing aggregate definitions. Each aggregate definition may specify a key, an output store, a feature, a half-life value, and an aggregate operation to apply to a cross of the feature and the half-life value to generate aggregate metrics. The system may also include memory storing an aggregation engine configured to generate aggregate feature records from the input source based on the aggregate definitions and store the aggregate feature records in the output store, an aggregate feature record including an aggregate metric for the feature decayed over time using the half-life value. The system may also include memory storing a query service. The query service is configured to receive a request having parameters and identify, using the aggregate definitions, responsive aggregate feature records that satisfy the parameters. The query service is further configured to apply the half-life to the responsive feature records and provide the responsive feature records to a requester, the requester using the responsive feature records as input for a neural network.

In one aspect, a method includes reading a new record from an input source and accessing a plurality of aggregate definitions. Each of the plurality of aggregate definitions specifies a key, an output store indicating a location for aggregate records generated from the aggregate definition, a feature set indicating one or more information fields from the input source, a half-life value set indicating one or more time periods, and a set of aggregate operations to apply to a cross of the feature set and half-life value set to generate a set of aggregate metrics. The method may include determining, based on the accessing, a respective input key value for each of the aggregate definitions. The respective input key value is determined based on the key for the aggregate definition and a corresponding value from the new record. The method also includes identifying first aggregate feature records in output stores associated with the plurality of aggregate definitions, each first aggregate feature record having a value for the key that matches the respective input key value for the aggregate definition. Each first aggregate feature record includes one or more aggregate metrics, the plurality representing a cross of the feature set, the half-life value set, and the aggregate operation set specified in the aggregate definition. The method also includes, for each of the first aggregate feature records, updating the aggregate metrics using the record from the input source and a half-life decay applied to the aggregate metrics. The method also includes using the aggregate feature records as input to a neural network.

In one aspect, a method includes receiving a query parameter and determining, from a plurality of aggregate definitions, responsive aggregate definitions that are responsive to the parameter. Each of the plurality of aggregate definitions specifies a key, an output store indicating a location for aggregate records generated from the aggregate definition, a feature set indicating one or more information fields from the input source, a half-life value set indicating one or more time periods, and a set of aggregate operations identifying one or more aggregate operators to apply to a cross of the feature set and half-life value set. The method may also include obtaining responsive aggregate feature records that are responsive to the parameter from output stores specified in the responsive aggregate definitions and applying a half-life decay to each responsive aggregate feature record. The half-life decay for a particular aggregate feature record may be based on a timestamp associated with the particular aggregate feature record and a last-update timestamp. The method may also include providing the responsive aggregate feature records as input to a neural network.

Implementations can include one or more of the following benefits. For example, disclosed implementations include the ability to generate features from real-time content in a fast-changing and large corpus. The features can be used suggest or recommend additional content to a particular user. For example, the features may help a machine learning ranker personalize a rank of a message (e.g., a tweet or post)

based on the aggregates. Thus, real-time user interactions can be used in recommendations for fast-changing content. As another example, aggregate metrics can be added and removed easily, minimizing the maintenance of extraction processes and query processes needed to incorporate the new signals into training processes. For example a new aggregate grouping, a new feature, and/or a new aggregate operator can be added without any code changes. Once the new aggregate feature records exist, they can be incorporated into existing training and inference pipelines. Thus, for example, output from a neural network can be trained with a feature representing a new aggregate grouping or new aggregate operators and compared to an older neural network that lacks the feature to determine if the new feature benefits the output. If it does not, the new grouping or feature can easily be removed from the schema.

As another example, the schema is generic and can be used by both an online and an offline process to generate the features, which can then be used in both online training of a machine-learned model and in online training of a machine-learned model. Thus, the flexibility and reusability of the schema reduces code maintenance because maintenance related to adding a single aggregate can be one once instead of four times.

BRIEF DESCRIPTION OF THE DRAWINGS

FIG. 2 illustrates an example aggregate feature definition schema, according to an implementation.

Like reference symbols in the various drawings indicate like elements.

DETAILED DESCRIPTION

Figure 1:
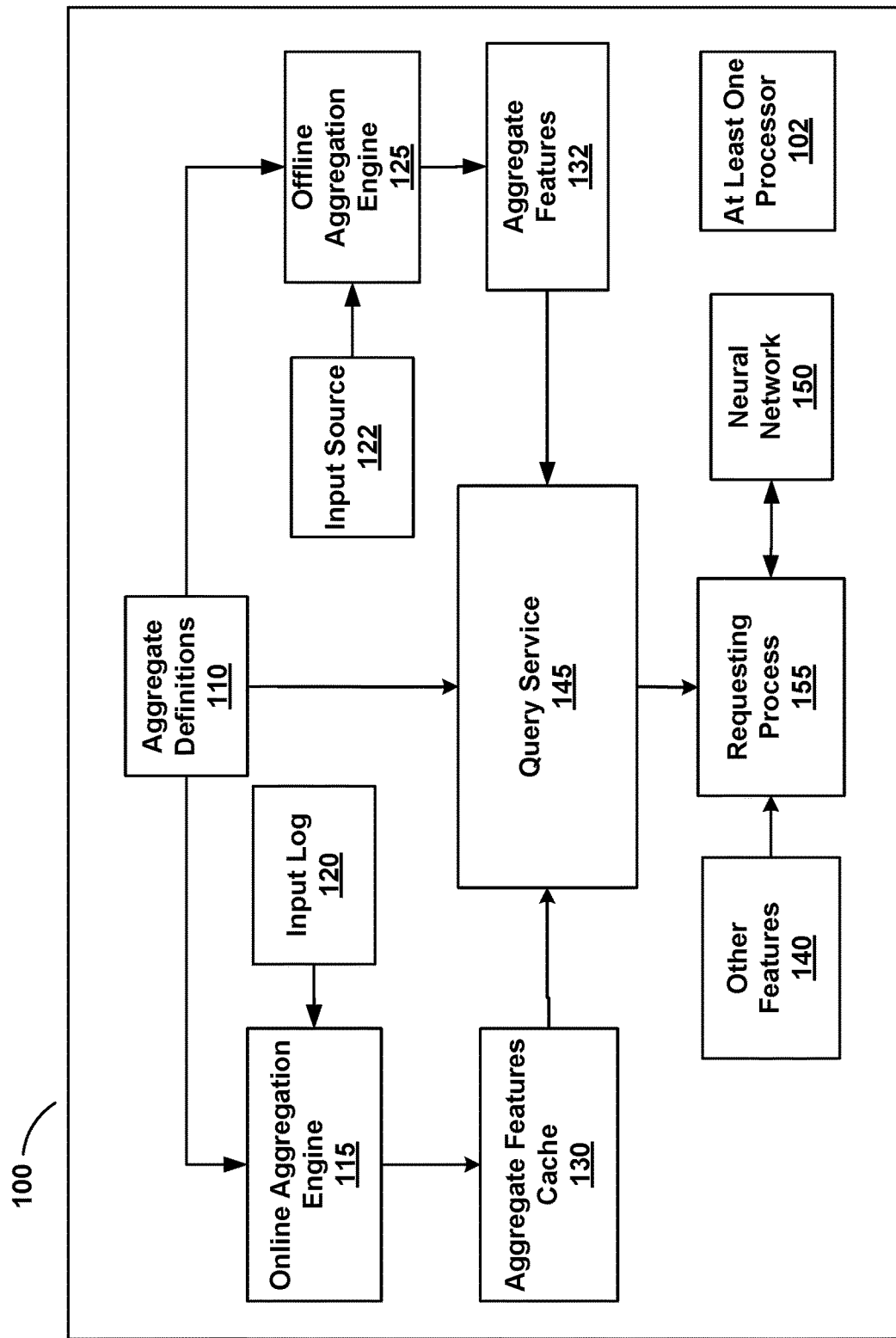
FIG. 1 is a schematic diagram of an example aggregate feature generation system, according to an implementation.

FIG. 1 is a block diagram of an aggregate feature generation system 100 in accordance with an example implementation. The system 100 may use a novel aggregate feature schema to generate aggregate feature records that can be used to provide historical data to a neural network for training or inference. The aggregate feature records offer a convenient way to track aggregate metrics, e.g., counts, averages, means, etc. over time. The aggregate definition schema offers flexibility to the system because features, labels, aggregate operators, etc. can be added or removed without changing the engines that generate the records and the query service that provides the records to the neural network. The aggregate definition schema is flexible and can be used in any machine learning task that benefits from historical data. One example of such a task is recommendations for a user. Historical information about a user is useful for predicting future behavior. For ease of discussion, the depiction of system 100 in FIG. 1 may be described as a social media platform for ranking documents to suggest for viewing. However, implementations are not so limited and can easily be applied to any task that uses machine learning. For example, system 100 in FIG. 1 could be a system for auto-completing tasks, a system for suggesting new retail items, a system for weather, real-estate, or other trend prediction, etc.

Figure 6:
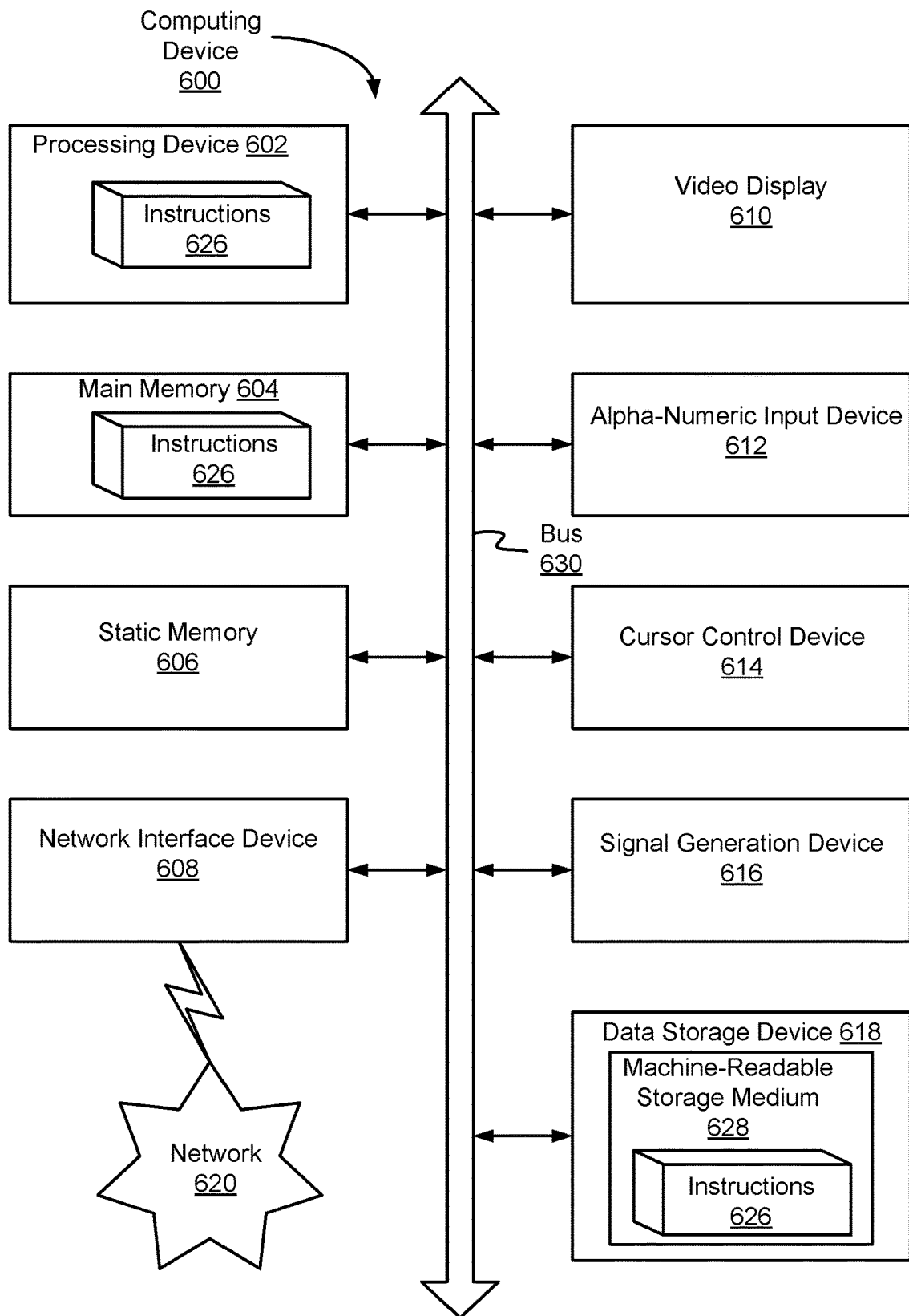
FIG. 6 is a is a schematic diagram of a machine in the example form of a computing device within which a set of instructions, for causing the machine to perform any one or more of the functions described herein, according to an implementation.

The aggregate feature generation system 100 may be a computing device or devices that take the form of a number of different devices, for example, a standard server, a group of such servers, or a rack server system. In addition, system 100 may be implemented in a personal computer, for example, a laptop computer. The aggregate feature generation system 100 may be an example of computing device 600, as depicted in FIG. 6.

The aggregate feature generation system 100 can include one or more processors 102 formed in a substrate configured to execute one or more machine executable instructions or pieces of software, firmware, or a combination thereof. The processors 102 can be semiconductor-based—that is, the processors can include semiconductor material that can perform digital logic. The aggregate feature generation system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The aggregate feature generation system 100 includes aggregate definitions 110. Aggregate definitions 110 may be stored in a memory. In some implementations, the aggregate definitions 110 may be stored in a memory remote from, but accessible (e.g., via a network) to, the system 100. Aggregate definitions 110 represent a schema for specifying what kind of data to aggregate and how to apply a decay, if any, to older historical data. The aggregate definitions 110 utilize a flexible schema that can be adapted to any problem or process. A user can create an aggregate definition via a text editor or a graphical user interface. Aggregate definitions can be added at any time, can be modified at any time, and can be removed at any time, as the engines and services that use the definitions do not require modification after such changes. Aggregate feature records generated according to the definition are considered to be in the same aggregate group. Thus, reference to an aggregate definition may also be considered reference to an aggregate group or a grouping.

FIG. 2 illustrates an example aggregate feature definition schema, according to an implementation. The example of FIG. 2 illustrates the elements that make up the schema. While the example of FIG. 2 illustrates one example of a format for the aggregate definition schema, implementations are not limited to the format illustrated and can include any format organized with similar elements. An aggregate definition 200 may include a prefix 205 element. The prefix 205 may be used to identify aggregate feature entries for an aggregate group. For example, if prefix 205 is "user_aggregate" a query service or aggregation engine may locate aggregate feature entries for this group by identifying records that match the glob pattern "user_aggregate.*". The prefix 205 need not be unique across definitions. In some implementations, the prefix 205 may be used to distinguish between different versions of an aggregate group. For example, if a feature, label, or half-life period is added or removed, the prefix 205 may be updated to indicate a different version of the definition. The aggregate definition 200 may also include input source 210. The input source 210 element may provide an indication to an aggregation engine of where to read input data records from. These input data records represent the data to be aggregated. In some implementations, the input data records are themselves feature records. A feature record is a record in a standard format recognized by the machine learning system as input. Thus, the input records may already be in a standard format recognized by the system as input for the neural network. In some implementations, the input data records may be in some other standard format recognized by the aggregation engines. In some implementations, the definition 200 may include a transform routine 215 element. The transform routine 215 specifies a process (e.g., module, function, or routine) to call with the input record before aggregating the input record. In some implementations, the transform routine 215 converts the input record into a standard format recognized by the aggregation engines. In some implementations, the transform routine 215 may perform preprocessing operations on the input record. For example, if a combined label (e.g., ITEM_SELECTED) is desired for two different fields in the input record (e.g., ITEM_PURCHASED and ITEM_WISHLISTED), a transform routine 215 may be used to convert any ITEM_PURCHASED labels and ITEM_WISHLISTED labels to an ITEM_SELECTED label. The transform routine 215 is optional and may be omitted or set to a nonce value, e.g., "none" or "null".

The definition 200 may also include a key 220 element. The key element identifies one or more features from the input record. Features are data fields in the input file. Any field identifiable in the input record can be a feature. The key 220 represents a set of one or more features from the input record for which grouping takes place. For example, if the key 220 specifies a USER_ID feature then the system aggregates the input records by user identifier and generates aggregate metrics (e.g., sum, count, etc.) for individual users. The key 220 may specify one or more features from the input file. For example, the key 220 may specify USER_ID and ITEM_ID. In this case, the aggregate metrics represent values for a grouping of input records by user identifier and item identifier. In some implementations, the user identifier is a primary key because it is listed first. In some implementations, the item identifier is a secondary key. In some implementations, the aggregate feature records can be indexed by primary key or secondary key. In some implementations, a feature can be included in the key 220 only if it has a certain type. For example, only features having a type of STRING, SPARSE_BINARY, or DISCRETE may be included in the key 220. A STRING type is a field having any combination of alphanumeric characters. A DISCRETE type is similar to STRING, but can only have certain values. For example, a feature of SIZE may only have the values S, M, and L and is therefore discrete. A SPARSE_BINARY type represents a set. For example, USER_INTERESTS may represent a set of topic identifiers. If a feature of the SPARSE_BINARY type is included in the key 220, the system groups the input records by set members. For example, a key 220 that specifies (USER_ID, USER_INTERESTS) causes the system to generate aggregate metrics for each user identifier-interest pair.

The definition 200 may also include a features 225 element. The features 225 identify a set of one or more fields (i.e., features) from the input record to aggregate within each grouping, the grouping being defined by the key 220. The features 225 can be any field in the input record, although fields that are of the BINARY or CONTINUOUS types work best. BINARY fields have a value of one or zero, e.g., either true or false. CONTINUOUS fields are numeric, e.g., representing some numeric value. Fields that are of the SPARSE or DISCRETE types can be included in the features 225, but are better used in key 220. In some implementations, SPARSE and DISCRETE features may be treated as BINARY types (e.g., a value for the field exists or does not exist) when used in the features 225.

The definition 200 may also include a labels 230 element. The labels 230 represent a set of zero, one, or more binary features from the input record. The system crosses the features 225 and labels 230 prior to applying the aggregate operations. This essentially restricts the aggregate computation to a subset of the input records within a particular key. The labels 230 element is optional and aggregates may be generated without the use of labels. The definition 200 may also include a half-lives 235 element. The half-lives 235 set represents one or more time periods used for computing decayed aggregate metrics. The system uses the half-lives 235 to cause older activity to have less importance than newer activity. Shorter half-life periods capture real-time features and longer half-life periods capture longer term history. For example, information about items recently viewed may be important for a few hours, but items shared, liked, or commented on may be important for a longer period of time, e.g., days or weeks. Thus, the time periods in the half-lives 235 set may be represented by minutes, hours, days, weeks, etc. In some implementations, the period may also be infinite, which means that older data is as important in the aggregate as newer data and is never decayed. If a particular aggregate definition lacks a half-life 235, the half-life may be assumed to be infinite.

The definition 200 also includes an operators 240 set. The operators 240 set specifies one or more aggregate operators to apply to the features 225. Aggregate operators are any operators that combine a series of numbers. Example aggregate operators are count, sum, sumSq, mean, ratio, etc. The count operator counts the number of non-zero occurrences of a binary feature. The count operator may treat all features as binary, meaning that if the feature is present in the input record, it is counted as a 1 and is zero otherwise. The sum operator may ignore any feature that is not CONTINUOUS, as a sum of any other type of feature has no real meaning. In some implementations, the sum and count operators may be the only operators supported, as other aggregate operators, such as mean, may be calculated from the metric values of count and sum. The operators 240 set are applied to a cross of features 225, labels 230, and half-lives 235. In other words, the system applies each aggregate operator in operators 240 to each unique label-feature pair for each half-life period, as will be explained in more detail below.

The definition 200 may also include an output store 245. The output store 245 points to the location where aggregate feature records generated using the definition 200 are stored. In some implementations, if two aggregate definitions share the same output store 245 and the same key 220, the aggregate feature records will be written to the same place. This can be beneficial when a full cross of the features 225, labels 230, and half-lives 235 is too large and only a subset of the full cross is useful. The definition 200 may also include an optional number of batches to keep 255. In some implementations, the system only keeps one aggregate feature record per key for the aggregate group, and just keeps updating the aggregate values as new data is processed. This minimizes storage space for the aggregates. If a history of the aggregate feature records is desired, the batches to keep 255 element may specify the number of previous aggregate feature records to keep. These previous records may be used as back-up in case of system failure, but are optional. Of course the definition 200 may also include other elements not illustrated.

Returning to FIG. 1, the system 100 may include an online aggregation engine 115 and an offline aggregation engine 125. The offline aggregation engine 125 aggregates batches of records from input source 122. Input source 122 may be any computer memory that stores input records. In some implementations, the input records may have been processed and formatted for the offline aggregation engine 125. For example, the input records from input source 122 may be feature records, e.g., in a standard format recognized by an embedding process for the neural network 150. The embedding process may convert the data in the feature records to numerical format and normalize the data, as is known in the field of machine learning. Thus, for example, input source 122 may be part of other features 140.

The offline aggregation engine 125 may run periodically, e.g., once per day, twice per day, weekly, or some other period. The offline aggregation engine 125 reads records from input source 122 and aggregate definitions 110 to generate aggregate features 132. In some implementations, the offline aggregation engine 125 associates a batch number with each aggregate feature record it generates. The batch number may be used to assign a time period to the aggregate feature record. For example, the system may associate each batch number with an end-time. This end-time may be used by the query service 145 to determine whether data records are missing and how to apply a decay to the aggregate metrics at query time. The offline aggregation engine 125 aggregates the records in the input source 122 based on the aggregate definitions 110 and outputs the resulting aggregate feature records, keyed by the keys of the aggregate definitions, to the output stores specified in the aggregate definitions. This process is explained in more detail with regard to FIG. 3. These output stores may all be represented by aggregate features 132. Aggregate features 132 may thus represent one or more computer memories storing the aggregate feature records generated by the offline aggregation engine 125.

In some implementations, the offline aggregation engine 125 may employ an optimization feature that groups all aggregate feature records that share the same key and output store together. Thus, when two or more aggregate definitions share a key and output store, the offline aggregation engine 125 may write one record for a given key value. The record will include all the aggregate metrics of both aggregate definitions.

The online aggregation engine 115 operates in a similar manner as the offline aggregation engine 125, except that instead of processing records in batches, the online aggregation engine 115 processes input records as they are received and no batch number is assigned to the aggregate feature records it generates. The online aggregation engine 115 may read log records from input log 120. In some implementations, the input log 120 may be the same store as input source 122. In some implementations, the input log 120 may be a different data store. In some implementations, the format of the input records in input log 120 may differ from those of the input source 122. The online aggregation engine 115 may output the aggregate feature records to aggregate feature cache 130. The aggregate feature cache 130 may be a temporary computer memory with limited space. In some implementations, older records may roll off of the cache 130 as memory in the cache 130 is needed. In some implementations, the aggregate feature records written to the cache 130 may be combined with the aggregate feature records in the aggregate features 132 at query time.

The system 100 may include a query service 145. The query service is configured to receive query requests from a requesting process 155 and use the aggregate definitions 110 to find aggregate feature records, e.g., from aggregate features cache 130 and aggregate features 132, that are responsive to the query. In some implementations, the query service 145 also applies a decay to the aggregate metrics in the responsive aggregate feature records. The query service may apply the decay so that data from older records (e.g., those having metrics last updated some time ago) are subjected to the decay before being provided to the requesting process 155. This ensures older data does not have as much weight as newer data, the weight reduction being based on the half-life. The query service 145 is configured to look for responsive aggregate feature records from both the batch and online aggregation engines, if both exist. The query service 145 may be configured to combine or to concatenate the records from the aggregate features cache 130 and the aggregate features 132, as described in more detail with regard to FIG. 4.

The system 100 may include requesting process 155. The requesting process can be any process that provides features to the neural network 150. For example, the requesting process 155 may be a ranking process, e.g., that determines for a particular user which documents, messages, items, or other content to suggest to the user. As another example, the requesting process 155 may be another type of prediction service, such as predicting trends in weather, markets, etc. In some implementations, requesting process 155 may also be remote from, but communicatively connected to system 100 and/or query service 145. In addition to the aggregate feature records, the requesting process 155 may also use other feature 140 as input to the neural network 150. In some implementations, the other features 140 may be feature records, e.g., a record format similar to that of the aggregate feature records. In some implementations, the other features 140 may be selected and sent by another query service (not shown). In some implementations, the other features 140 may be remote from but accessible by requesting process 155. The requesting process 155 may provide the features to neural network 150. In some implementations, the requesting process 155 may include an embedding process that converts the features into a feature vector. A feature vector is an array of numbers, typically floating point numbers, where each position in the array represents a different attribute or signal about the object. In some implementations, the feature vector may be normalized, so that the floating point numbers fall in a certain range. Thus, for example, each aggregate metric in an aggregate feature record may be normalized and assigned to a position in a feature vector. In some implementations, the requesting process 155 may calculate additional features, e.g., ratios, means, from the aggregate metric in the aggregate feature records.

In some implementations the requesting process 155 may be a training process for the neural network 150. In other words, the requesting process 155 may generate positive and/or negative training examples for the neural network 150 from the aggregate feature records and the other features 140. A positive training example is a data point that tells the neural network 150 that the input data object, or in other words the object identified in parameters provided to the query service 145, should be given a particular decision (e.g., should be recommended to the user). A negative training example is a data point that tells the neural network 150 that the input data object, or in other words the object identified in parameters provided to the query service 145, should not be given a particular decision (e.g., should not be recommended to the user). In some implementations, two or more requesting process 155 may be used to help determine whether a newly added aggregate feature benefits the prediction of the neural network 150, e.g., via A/B testing or the like.

The neural network 150 may represent any type of machine-learning network that performs a task on given input. In general, a neural network is an interconnected group of nodes, each node representing an artificial neuron. The nodes are connected to each other in layers, with the output of one layer becoming the input of a next layer. Neural networks transform an input, received by the input layer, through a series of hidden layers and produce an output via the output layer. Each layer is made up of a subset of the set of nodes. The nodes in hidden layers may be fully connected, e.g., receiving input from all nodes in the previous layer and providing output to all nodes in the next layer. The nodes in a single layer function independently of each other (i.e., do not share connections). The nodes in hidden layers may also be partially connected. Nodes in the output provide the transformed input to the requesting process. In some implementations, the neural network 150 may be a deep neural network, which has many hidden layers and can be used, with unsupervised or semi-supervised training, to identify patterns in the input feature vectors and use those patterns to perform a task/prediction.

Although not illustrated in FIG. 1, aggregate feature generation system 100 may be in communication with client(s) over a network. The clients may enable a human user to add an aggregate definition to the aggregate definitions 110, to add, remove, or change elements of an existing aggregate definition, or to remove an aggregate definition. Clients may also enable a user to set up additional requesting processes 155. The network may be for example, the Internet or the network can be a wired or wireless local area network (LAN), wide area network (WAN), etc., implemented using, for example, gateway devices, bridges, switches, and/or so forth. In some implementations, aggregate feature generation system 100 may be in communication with or include other computing devices that provide the input log 120 and records for the input source 122, as well as other features 140. In some implementations, aggregate feature generation system 100 may be in communication with or include other computing devices that store one or more of the objects, e.g., aggregate definitions 110, aggregate features cache 130, aggregate features 132, online aggregation engine 115, offline aggregation engine 125, input log 120, input source 122, query service 145, other features 140, requesting process 155, or neural network 150. Aggregate feature generation system 100 represents one example configuration and other configurations are possible. In addition, components of system 100 may be combined or distributed in a manner differently than illustrated. For example, in some implementations, one or more of the online aggregation engine 115, offline aggregation engine 125, query service 145, requesting process 155, and neural network 150 may be combined into a single module or engine and/or distributed between two or more modules or engines.

Figure 3:
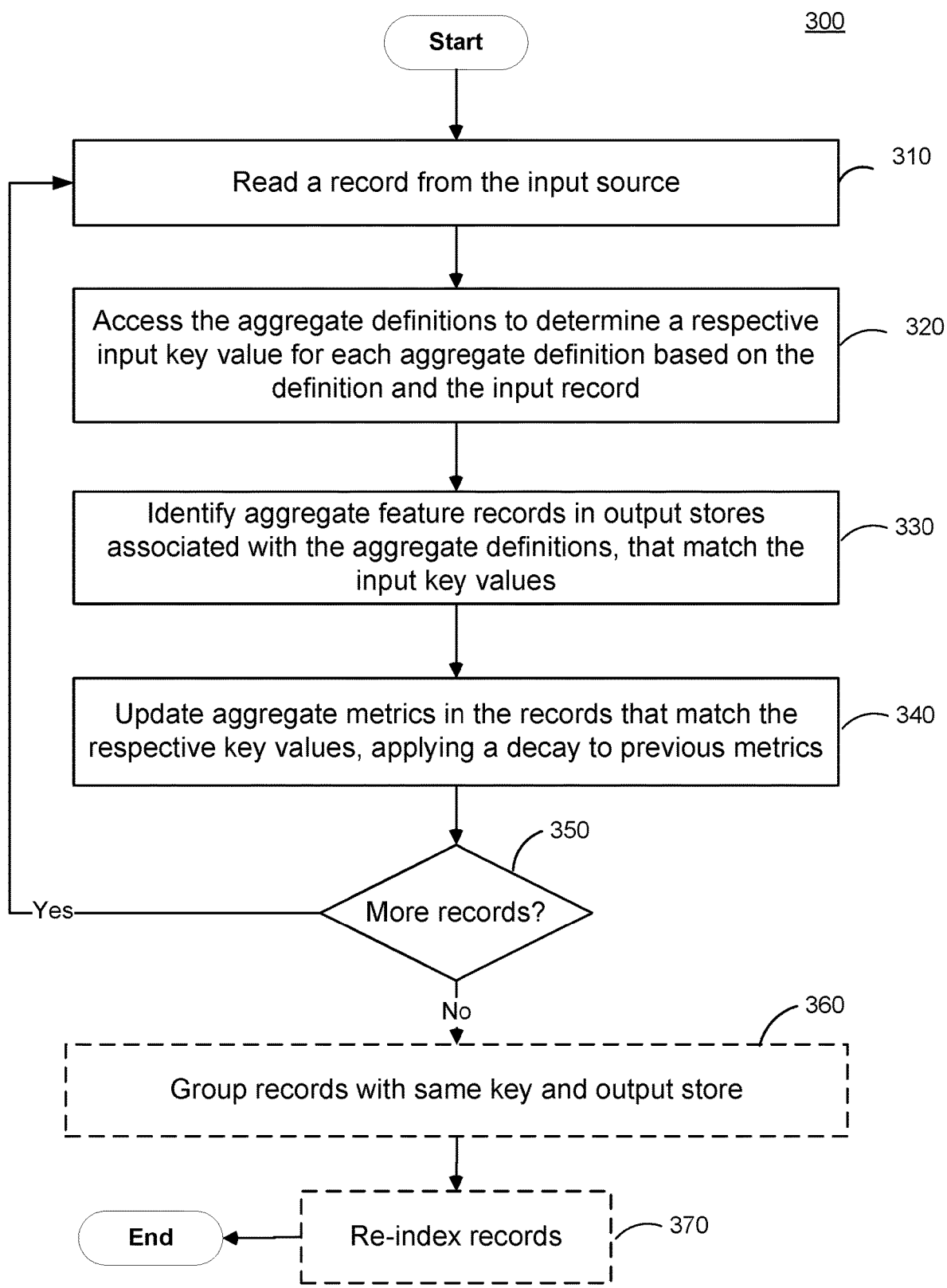
FIG. 3 is a flow diagram of an example process for using aggregate feature definitions to generate aggregate feature records, according to an implementation.

FIG. 3 illustrates a flow diagram of an example 300 for using aggregate feature definitions to generate aggregate feature records, according to an implementation. Process 300 may be performed by an aggregate feature generation system, such as system 100 of FIG. 1. The process 300 may generate the aggregate feature records in a batch/offline mode or in an online/real-time mode. For example, the process 300 may be performed by online aggregation engine 115 an offline aggregation engine 125. The aggregate feature records generated by process 300 thus enables fast-decaying aggregation metrics to be used with longer-decaying metrics as input for a neural network. When used in a batch mode, process 300 may be associated with a batch number. The batch number may be associated with each aggregate feature record generated during the batch run. The batch number may also be associated with a timestamp. The timestamp may represent a start time of the batch job or a stop time of the batch job. In some implementations, both a start and a stop time may be associated with the batch number. In some implementations, aggregate feature records generated by an online process may lack association with a batch number. In some implementations, the last update timestamp of the aggregate feature record generated by the online process may be the batch number. Thus, a record with a previous batch number may be the record with the most recent timestamp.

Process 300 may begin by reading a record from the input source (310). The input source can be any data file with records to be processed. In some implementations, the record may be in a feature record format, e.g., a feature record generated by a different process. In some implementations, the record may be in a database, log file, or other data source. In such implementations, reading the record from the input source may include providing the record to a transformation process, e.g., one specified in an aggregate definition such as transform 215 in FIG. 2, prior to processing the record. The system may access the aggregate definitions to determine, for each aggregate definition, an input key value (320). The input key value is based on the aggregate definition and the input record. For example, the aggregate definition specifies (e.g., in key 220) one or more fields or features in the input record that serve as the aggregate group, or key, for that definition. The system identifies this field in the input record and takes the value of that field as the input key value. For example, the system may determine that for an aggregate definition having a (user_id,doc_id) key, a data record having a user id of 12345 and a document id of 9876 would have a key value of (12345,9876). Each aggregate definition can have a different key, but the keys do not need to be unique among aggregate definitions. In some implementations, the aggregate definition can specify a location of the input source, so that only input records from that source access the aggregate definition.

The system identifies, based on the aggregate definitions and input key values, aggregate feature records in the output stores that match the input key value (330). Each aggregate definition may have an associated output store (e.g., output store 245). These output stores identify which aggregate feature records belong to which aggregate definitions, but need not be unique. Using the input key value for an aggregate definition, the system can search for an existing aggregate feature record for that key in the output data store. In batch processing, the existing aggregate feature record may be from the current batch when the aggregate feature record has already been updated at least once during the batch run, or from a previous batch. In an online process, an aggregate feature record with a most recent time stamp is the existing aggregate feature record. If no existing aggregate feature record exists in the output store, the system generates a new record during the update, as explained below.

The system may update the aggregate feature records identified, applying a decay to the previous metrics (340). For example, when the system identifies an aggregate feature record for a particular group, the system may combine the input record into the aggregate feature record, but apply a decay as it does so. The half-lives (e.g., half-lives 235) specify how to decay the old/existing values so that the aggregate metrics cover a sliding window of counts. For example, given a half life of H, if the metric (e.g., a sum or a count) is X for a particular feature (or feature/label pair) at time $t_{old}$ and the input record has a new aggregate metric of Y at time $t_{new}$, the aggregate metric is updated according to $$Y + X * 2^{\{\frac{(t_{old} - t_{new})}{H}\}}.$$

In this manner, shorter half lives can capture more real-time features and longer half-lives cover and capture longer term history. If the aggregate record being updated is from the same batch number, $t_{old}$ and $t_{new}$ are the same and the decay is zero, so that X and Y are added together. If no previous record exists, updating the record includes setting the aggregate metric to the value of Y.

In addition to the features specified in the aggregate definition, in some implementations, the system may add an additional feature that represents all features, e.g., "all features". This feature may be added automatically by the system, without specification in the aggregate definition. For a count aggregate operation, this feature is always one for every input record, so this metric represents the total number of records identified for the key. In addition, when the aggregate definition identifies a label, the system may add an "all labels" label. Thus, when the feature definition specifies a label, the system may add entries for the aggregate operations applied to a cross of "all_labels" with each feature in the feature set. These additional aggregate metrics can be useful in calculating ratios, e.g. the fraction of all messages that were liked. The system writes the new aggregate feature record (or the updated record) to the output store. In some implementations, each update may be associated with a timestamp. An example of updating an aggregate feature record is provided below with regard to FIG. 5.

In some implementations, the system may include several processing nodes (whether physical nodes or logical nodes) to process the aggregate definitions in parallel. For example, if three aggregate definitions have a user_id key and one has a doc_id key, the input record may be sent to two different processing nodes in parallel so that the aggregate definitions using user_id as the key are processed by the first node and the aggregate definitions using doc_id as the key are processed by the second node. Thus, steps 330 and 340 may be performed in parallel for the various aggregate definitions.

If there are additional records to process (350, Yes), the system reads the next record from the input source (310) and performs steps 320 to 340 for this record. Once all records have been processed, (350, No), the system may perform wrap-up tasks, such as associating a stop time with the batch number and indexing the aggregate feature records by the full key or by primary key (if the key includes multiple features). In some offline implementations, the system may identify records from the previous batch that were not updated in the current batch, apply the decay to the aggregate metrics, and write a record into the current batch output store. In such implementations, timestamp for the record is not updated. In some implementations, the system may concatenate entries in feature records that share the same key and output store together into a single record (360). Thus, the aggregate metrics for similar keys and output stores can be stored as entries in a single record. This is an optional feature for optimization purposes. In some implementations, the system may also perform additional indexing, e.g., indexing the aggregate feature records by a secondary feature in the key (370). Process 300 then ends, having generated the aggregate feature records, which are available for input to a neural network. Once the input records have been included into an aggregate feature, they do not need to be stored, unless the input record is also used as input to the neural network or another process. Accordingly, a system using the aggregate feature records has a smaller memory footprint and operates faster than systems that lack aggregate feature records.

Figure 4:
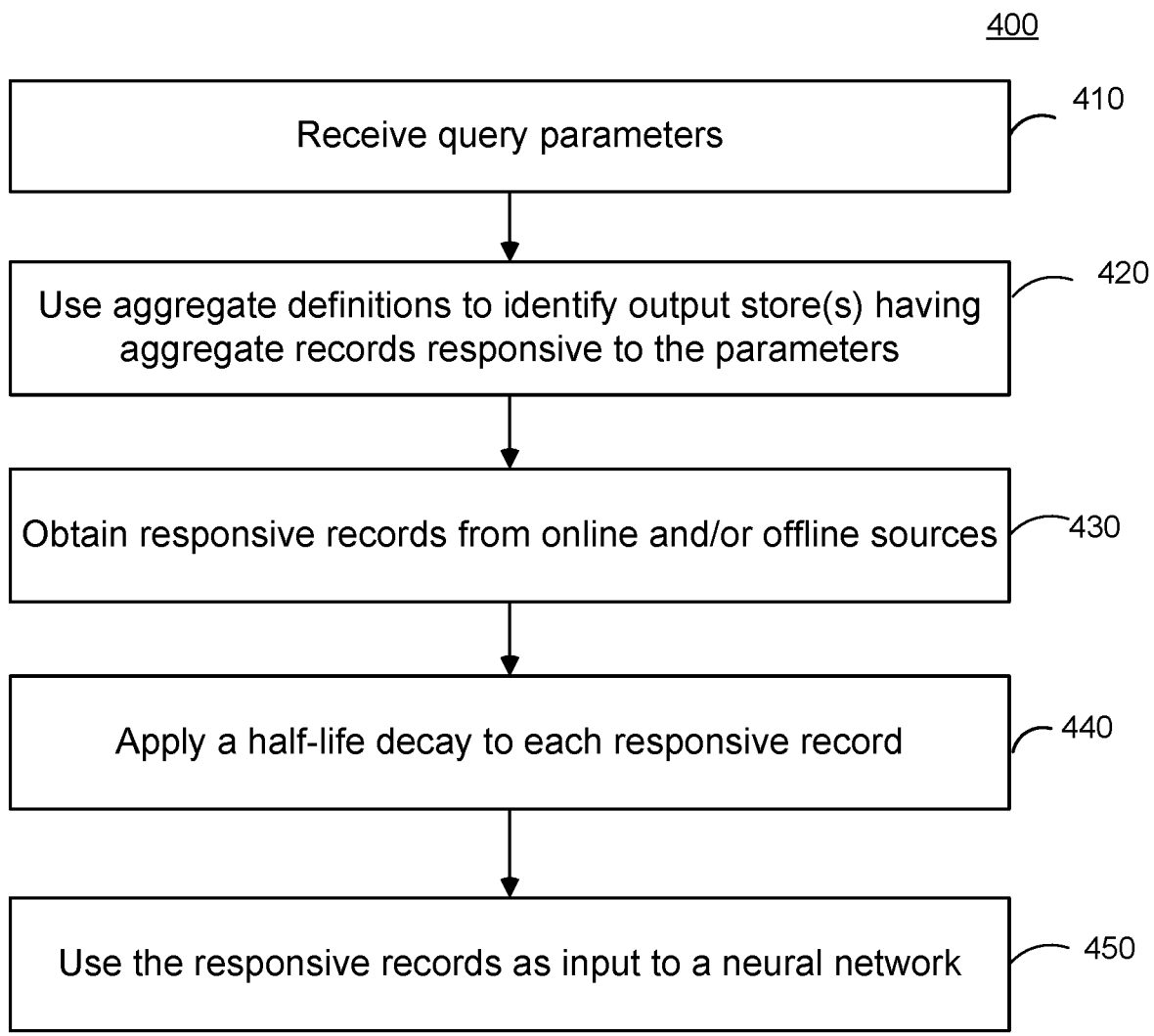
FIG. 4 is a flow diagram of an example process for using aggregate feature definitions and aggregate feature records to provide features to a neural network, according to an implementation.

FIG. 4 is a flow diagram of an example process 400 for using aggregate feature definitions and aggregate feature records to provide features to a neural network, according to an implementation. Process 400 may be performed by an aggregate feature generation system, such as system 100 of FIG. 1. The process 400 may identify aggregate feature records responsive to a query from multiple sources, e.g., a batch and an offline source, apply a decay to the aggregate feature records, and provide the responsive, decayed aggregate feature records to the requesting process. Process 400 may begin by receiving query parameters (410). The query parameters may specify a grouping key. The grouping key is the name of a field or feature that is specified in the key of an aggregate definition and the desired value for that field. For example, a grouping key may be "user_id=12345" or "document_id=9876 and topic=4B". The query parameters may also optionally specify an output source. When an output source is specified, the system may only look for aggregate feature records in the corresponding output source. The query parameters may also specify an input record. When an input record is specified, the system queries all aggregate feature records from all output stores that and merges them with the input record. Thus, the query service can compute an updated aggregate feature record using the input record.

The system may use the aggregate definitions to identify output stores and aggregate feature records responsive to the parameters (420). For example, if the parameters specify a user id grouping key, the system will identify output stores specified in aggregate definitions that have the user id as the key. When the parameter is an input record, all aggregate definitions are examined and the output stores specified are identified. As another example, if an output store is provided in the parameter, only those aggregate definitions specifying a matching output store are responsive. The system obtains the responsive records from the identified sources (430). For example, in the user id key example, the system looks in the output stores identified in the previous step, and obtains aggregate feature records from the output stores that match the value of the grouping key. As another example, when an input record is the parameter, the system obtains any aggregate feature records that match the key fields from the input record, the key fields being identified in the aggregate definition.

The system may apply a decay to the responsive aggregate feature records (440). The system may store a last update timestamp for each aggregate feature record. In some implementations, the system applies the exponential decay (discussed above with regard to step 340 of FIG. 3), using the current query time as $t_{new}$ and the end time of the batch as $t_{old}$. In some implementations, the system may apply the exponential decay using the last update timestamp as $t_{old}$. For aggregate records generated with an online process, $t_{old}$ may be the time last updated timestamp for the aggregate feature record. The system may query both batch and online output sources. In some implementations, the results, when the key and aggregate operation both match, can be combined. In other implementations, the results are concatenated. The system returns the responsive aggregate feature records, which are then used as input to a neural network (450). In some implementations, the records may be combined with other features and converted into a feature vector before being provided as input. In some implementations, the system may add labels to the features for training the neural network. In some implementations, the features may be used to identify a pattern in the data. In some implementations, the neural network may use the features to make a prediction. Because process 400 provides specific historical features for an entity, the neural network can make better predictions for that entity. In other words, using the aggregate features can make the neural network more accurate.

Figure 5:
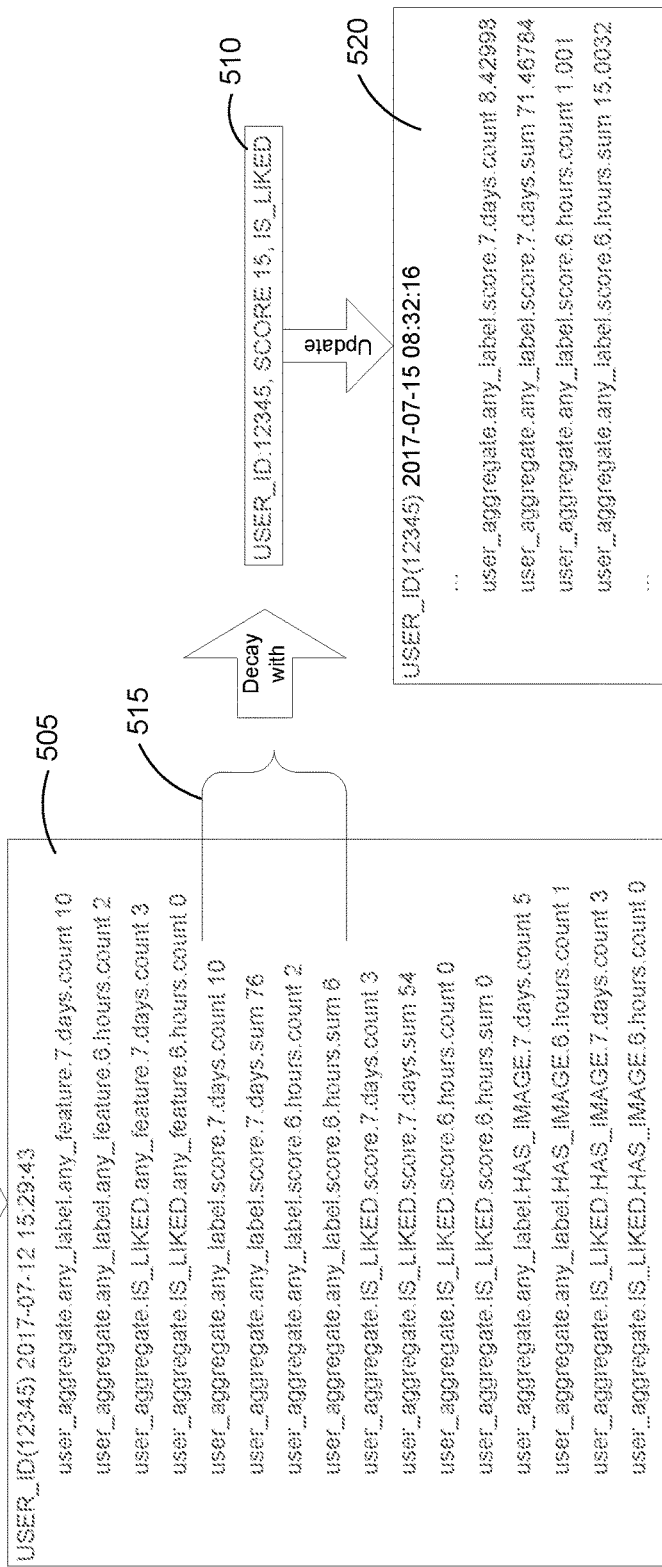
FIG. 5 illustrates a schematic diagram of an example aggregate feature definition, an example aggregate feature record, and an example update to the aggregate feature record using a half-life decay, in accordance with some implementations.

FIG. 5 illustrates a schematic diagram of an example aggregate definition 500, an example aggregate feature record 505, and an example updated feature record 520 using a half-life decay, in accordance with some implementations. In the example of FIG. 5, the input records are related to a score (such as a rank) calculated for a document provided to a given user. The aggregate grouping is by user id and the aggregate operations are count and sum. The features specified in the aggregate definition 500 are a score and a binary flag indicating whether there was an image included in or attached to the document. For example, the document may be a social media post, which may or may not have an image attached or embedded. The aggregate definition 500 also includes a label feature that is an indication of whether the user signaled approval for the document, e.g., liked, favorited, loved, etc. In addition, the aggregate definition includes two half-lives, one for a period of 7 days and another for six hours. The system will apply the sum operation and the count operation to each feature/label pair for each half life, i.e., a full cross of the feature, label, and half-life sets. Of course, some aggregate operations do not make sense to apply to certain types of features. For example, a sum operation does not apply to a binary feature and the system may ignore the application of that operation to binary features or labels. In addition, the system may include a sum operation for a cross of "all_features," and "all_labels," for each half-life. The "all_features" feature and the "all_labels" label is considered present in any input record.

Item 505 represents an aggregate feature record generated using the aggregate definition 500. The feature record 505 is for a user identified by the user identifier 12345 and is associated with the timestamp illustrated after the user identifier. The first entry is a metric representing a count of the input records decayed over the last 7 days, regardless of features or labels. The next entry is a metric representing a count of the input records decayed over the last 6 hours regardless of features or labels. The next two entries are metrics representing counts of documents that were liked decayed over the last 7 days and 6 hours respectively, regardless of feature. The next entry is a metric representing a count of input records having a score present, decayed over 7 days followed by a metric representing a sum of these scores, decayed over 7 days. The next two entries are similar, but decayed over 6 hours. The next entry is a metric representing a count of the input records where a score is present and the user indicated approval of the document, decayed over 7 days followed by an entry with a metric that represents a sum of the scores, decayed over 7 days. The entries continue in a similar fashion, although no sum operation is calculated for the final entries, because these are binary features and a sum operation does not make sense for a binary feature.

Item 510 represents an input being processed, e.g., by online aggregation engine 115. In some implementations, the system may have applied the transformation operation "myLib/log_to_daterec( )" to the input record to generate the input record 510. The input record 510 specifies a user id, a score, and that the document received an indication of appreciation, but did not include an image. Of course, other information not shown may be included in the input record, but is not illustrated for the sake of brevity. The system updates the aggregate feature record 505 with the input record 510, applying the appropriate decays. For example, suppose the current time stamp is "2017-07-15 08:32:16"—the system uses this timestamp as $t_{new}$. For the sake of brevity, FIG. 5 illustrates how the entries 515 are updated with the decay applied to generate updated aggregate feature record 520. For example, the system may calculate the exponent (12-15)/7 to give -0.42857. The system then calculates $10*2^{-0.42857}$ to be 7.42998 and adds one (the count for record 510, because record 510 does include a score), resulting in 8.42998. The system updates the metric from 10 to 8.42998 in the aggregate feature record 520. Similarly, the system calculates 76*2-0.42857 to be 56.467848 and adds 15, resulting in 71.46784. These are the metric updated with a decay of 7 days. For the decay of 6 hours, the system calculates the difference in hours between the two timestamps, e.g., -65 and calculates $1+(2*2^{(-65/6)})$ to be 1.0010 and updates the aggregation feature record 520 with this metric. This calculation shows how the short decay makes the prior metric almost irrelevant in the face of a time period much larger than the half-life. Similarly, the system updates the sum for the 6 hour half-life to 15 (15+(6* $2^{(-65/6)}$).

As FIG. 5 illustrates, the size of an aggregate feature record 515 can grow large as the number of features, labels, and half-lives, because a full cross is performed. To reduce the size of the entries in the aggregate feature record 515, two aggregate feature definitions may be created, each sharing the same keys and output stores. This will result in fewer entries. For example, if the 6 hour half-life is especially useful for the score sum, the 6 hour half life can be removed from definition 500 and moved to another definition. This will remove all entries for the 7 days half-life that include the score (e.g., 4 entries) without any data loss.

FIG. 6 illustrates a diagrammatic representation of a machine in the example form of a computing device 600 within which a set of instructions, for causing the machine to perform any one or more of the methodologies discussed herein, may be executed. The computing device 600 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 600 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 (e.g., instructions for an application ranking system) for performing the operations and steps discussed herein.

The computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one implementation, the video display unit 610, the alphanumeric input device 612, and the cursor control device 614 may be combined into a single component or device (e.g., an LCD touch screen).

The data storage device 618 may include a computer-readable storage medium 628 on which is stored one or more sets of instructions 626 (e.g., instructions for the application ranking system) embodying any one or more of the methodologies or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 620 via the network interface device 608.

While the computer-readable storage medium 628 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

In one aspect, a system includes at least one processor and memory storing aggregate definitions. Each aggregate definition may specify a key, an output store, a feature, a half-life value, and an aggregate operation to apply to a cross of the feature and the half-life value to generate aggregate metrics. The system may also include memory storing an aggregation engine configured to generate aggregate feature records from the input source based on the aggregate definitions and store the aggregate feature records in the output store, an aggregate feature record including an aggregate metric for the feature decayed over time using the half-life value. The system may also include memory storing a query service. The query service is configured to receive a request having parameters and identify, using the aggregate definitions, responsive aggregate feature records that satisfy the parameters. The query service is further configured to apply the half-life to the responsive feature records and provide the responsive feature records to a requester, the requester using the responsive feature records as input for a neural network.

These and other aspects may include one or more of the following. For example, the feature may be a binary field or a continuous field found in the input source. In some implementations, at least some aggregate definitions further specify a label, the label being a binary field found in the input source, and the aggregation engine may apply the aggregate operation to a full cross of the feature and the label and the half-life value. As another example, the key is a binary field, a discrete field, or a sparse field found in the input source. As another example, at least one aggregate definition may include two half-life values and the aggregate feature records generated from the at least one aggregate definition include the aggregate operation applied to a cross of the feature and each of the two half-life values. As another example, the aggregation engine and query service may continue to operate when a second feature is added to an aggregate definition. As another example, each aggregate feature record includes a version. As another example, at least some aggregate definitions may also specify a transformation engine for translating data in the input source to a common input format used by the aggregation engine. As another example, the aggregate feature record may include a total count of records regardless of feature. As another example, the aggregation engine may generate aggregate feature records in a batch mode and each aggregate feature record may be associated with a batch number and the query service is configured to apply the half-life to a first aggregate feature record based on an end time for the batch number and a last update date associated with the first aggregate feature record.

In one aspect, a method includes reading a new record from an input source and accessing a plurality of aggregate definitions. Each of the plurality of aggregate definitions specifies a key, an output store indicating a location for aggregate records generated from the aggregate definition, a feature set indicating one or more information fields from the input source, a half-life value set indicating one or more time periods, and a set of aggregate operations to apply to a cross of the feature set and half-life value set to generate a set of aggregate metrics. The method may include determining, based on the accessing, a respective input key value for each of the aggregate definitions. The respective input key value is determined based on the key for the aggregate definition and a corresponding value from the new record. The method also includes identifying first aggregate feature records in output stores associated with the plurality of aggregate definitions, each first aggregate feature record having a value for the key that matches the respective input key value for the aggregate definition. Each first aggregate feature record includes one or more aggregate metrics, the plurality representing a cross of the feature set, the half-life value set, and the aggregate operation set specified in the aggregate definition. The method also includes, for each of the first aggregate feature records, updating the aggregate metrics using the record from the input source and a half-life decay applied to the aggregate metrics. The method also includes using the aggregate feature records as input to a neural network.

These and other aspects can include one or more of the following features. For example, updating the aggregate metrics can include, for each of the first aggregate feature records, computing current aggregate metrics for the record from the input source and combining the current aggregate metrics with decayed aggregate metrics of the first aggregate feature record. In some implementations, the combining the current aggregate metrics with decayed aggregate metrics is accomplished according to $$Y + X * 2^{\frac{(t_{old} - t_{new})}{H}},$$

where X is a prior aggregate metric, $t_{old}$ is a timestamp associated with X, Y is the current aggregate metric, $t_{new}$ is a timestamp associated with Y, and H is the half-life value. As another example, using the aggregate feature records as input to a neural network can include receiving a query specifying parameters, obtaining responsive aggregate feature records that match the parameters using the plurality of aggregate definitions, and providing the responsive aggregate feature records to the neural network. As another example, at least one of the aggregate definitions may further specify a transformation routine and the method further includes performing the transformation routine on the input record before identifying the first aggregate records. As another example, at least one of the plurality of aggregate definitions may further specify a label set and the aggregate operation set may be applied to the cross of the feature set, the label set, and half-life value set.

In one aspect, a method includes receiving a query parameter and determining, from a plurality of aggregate definitions, responsive aggregate definitions that are responsive to the parameter. Each of the plurality of aggregate definitions specifies a key, an output store indicating a location for aggregate records generated from the aggregate definition, a feature set indicating one or more information fields from the input source, a half-life value set indicating one or more time periods, and a set of aggregate operations identifying one or more aggregate operators to apply to a cross of the feature set and half-life value set. The method may also include obtaining responsive aggregate feature records that are responsive to the parameter from output stores specified in the responsive aggregate definitions and applying a half-life decay to each responsive aggregate feature record. The half-life decay for a particular aggregate feature record may be based on a timestamp associated with the particular aggregate feature record and a last-update timestamp. The method may also include providing the responsive aggregate feature records as input to a neural network.

These and other aspects can include one or more of the following features. For example, at least some of the output stores may be from an online source and at least some of the output stores are from a batch source. As another example, the query parameter may specify a key-value pair and the responsive aggregate definitions have a key that matches the key of the key-value pair. In some implementations, the query parameter may represent a user identifier the key and providing the responsive aggregate feature records as input to the neural network increases the accuracy of a prediction by the neural network for the user. As another example, the query parameter may be a record having a same format as the aggregate feature records and the responsive aggregate definitions have a key that matches the key of the key-value pair. As another example, the query parameter may be a record having a same format as the aggregate feature records and the responsive aggregate definitions are the plurality of aggregate definitions and the responsive aggregate feature records are aggregate feature records with an associated respective key value that matches the value of a field in the record corresponding to the key of the respective aggregate definition for the aggregate feature record.

In one aspect, a system includes at least one processor and memory storing instructions that, when executed by the at least one processor, causes the computing system to perform any of the processes or methods disclosed herein.

What is claimed is:

1. A system comprising:
   at least one processor;
   memory storing a plurality of output files, each output file storing aggregate feature records generated from an aggregate definition in which the output file is identified, each aggregate feature record having at least:
   a key value corresponding to a key field in the aggregate definition, and
   aggregate metrics, each aggregate metric of the aggregate metrics representing a value based on an aggregate operation in the aggregate definition applied to a feature in the aggregate definition modified by a half-life in the aggregate definition, the aggregate metric being associated, in the output file, with a respective operation, a respective feature, and a respective half-life used to calculate the aggregate metric;
   memory storing an aggregation engine configured to update the aggregate feature records from an input source using a plurality of aggregate definitions; and
   memory storing a query service configured to:
   receive a request having parameters,
   identify, using the plurality of aggregate definitions, responsive aggregate feature records that satisfy the parameters,
   decay each aggregate metric in the responsive aggregate feature records according to the respective half-life associated with the aggregate metric, and
   provide the responsive aggregate feature records to a requesting process.

2. The system of claim 1, wherein features in the plurality of aggregate definitions are each one of a binary field or a continuous field found in the input source.

3. The system of claim 1, wherein at least some aggregate definitions further specify a label, and the aggregation engine applies, for each aggregate definition in the at least some aggregate definitions, the aggregate operation identified in the aggregate definition to unique combinations of each feature, the label and each half-life in the aggregate definition.

4. The system of claim 3, wherein the label is a binary field found in the input source.

5. The system of claim 1, wherein a first aggregate definition further specifies a transformation routine and the aggregation engine is further configured to perform the transformation routine on records from the input source before updating aggregate feature records generated from the first aggregate definition.

6. The system of claim 1, wherein the aggregation engine and the query service continue to operate when a second feature is added to an aggregate definition.

7. The system of claim 1, wherein each aggregate feature record includes a version.

8. The system of claim 1, wherein each aggregate feature record includes a total count regardless of feature.

9. The system of claim 1, wherein the aggregation engine generates aggregate feature records in a batch mode and each aggregate feature record is associated with a batch number and the query service is configured to apply the respective half-life to a first aggregate feature record based on an end time for the batch number and a last update date associated with the first aggregate feature record.

10. The system of claim 1, wherein the aggregation engine is configured to read aggregate definitions before updating aggregate feature records, so that an added field or label in an aggregate definition results in additional aggregate metrics.

11. A method comprising:
    receiving a first query from a first process requesting at least a first aggregate definition;
    obtaining, from an output store identified in the first aggregate definition, a plurality of aggregate feature records, each aggregate feature record including at least:

a value for a key field specified by the first aggregate definition, and aggregate metrics for operations applied to unique combinations of labels and features specified in the first aggregate definition, each aggregate metric of the aggregate metrics being associated, in the output store, with the label, the feature, and the operation used to calculate the aggregate metric;

applying a half-life decay to each aggregate metric in the plurality of aggregate feature records, the half-life decay for a particular aggregate feature record of the plurality of aggregate feature records being based on a timestamp associated with the particular aggregate feature record, a half-life specified in the first aggregate definition, and a timestamp for the first query; and providing the plurality of aggregate feature records to the first process, the first process using at least some of the plurality of aggregate feature records to obtain a prediction from a machine learned model.

12. The method of claim 11, wherein the prediction is a first prediction and the method further comprises:

receiving a second query from a second process requesting at least a second aggregate definition, the second aggregate definition including the labels and features of the first aggregate definition and an additional feature;

obtaining, from an output store identified in the second aggregate definition, a second plurality of aggregate feature records, each aggregate feature record in the second plurality of aggregate feature records including at least:

a value for a key field specified by the second aggregate definition, and aggregate metrics for operations applied to unique combinations of labels and features specified in the second aggregate definition;

applying a half-life decay to each aggregate metric in the second plurality of aggregate feature records, the half-life decay for a particular aggregate feature record of the second plurality of aggregate feature records being based on a timestamp associated with the particular aggregate feature record, a half-life specified in the second aggregate definition, and a timestamp for the second query; and providing the second plurality of aggregate feature records to the second process, the second process using at least some of the second plurality of aggregate feature records to obtain a second prediction, wherein the first prediction and the second prediction are used for AB testing.

13. The method of claim 11, wherein a feature is a binary field or a continuous field found in an input source.

14. The method of claim 13, wherein at least one of the labels is a binary field found in the input source.

15. The method of claim 11, wherein the first query specifies an identifier for the first aggregate definition.

16. The method of claim 11, wherein the first query specifies a location of the output store identified in the first aggregate definition.

17. The method of claim 11, wherein the first query identifies the first aggregate definition and specifies a key value for the key field specified in the first aggregate definition.

18. The method of claim 11, wherein each aggregate feature record in the plurality of aggregate feature records further includes an aggregate metric for each feature specified in the first aggregate definition regardless of label.

19. The method of claim 11, wherein each aggregate feature record in the plurality of aggregate feature records further includes an aggregate metric for each label specified in the first aggregate definition regardless of feature.

20. The method of claim 11, wherein each aggregate feature record in the plurality of aggregate feature records further includes an aggregate metric regardless of label or feature.

* * * * *